Figure 1:
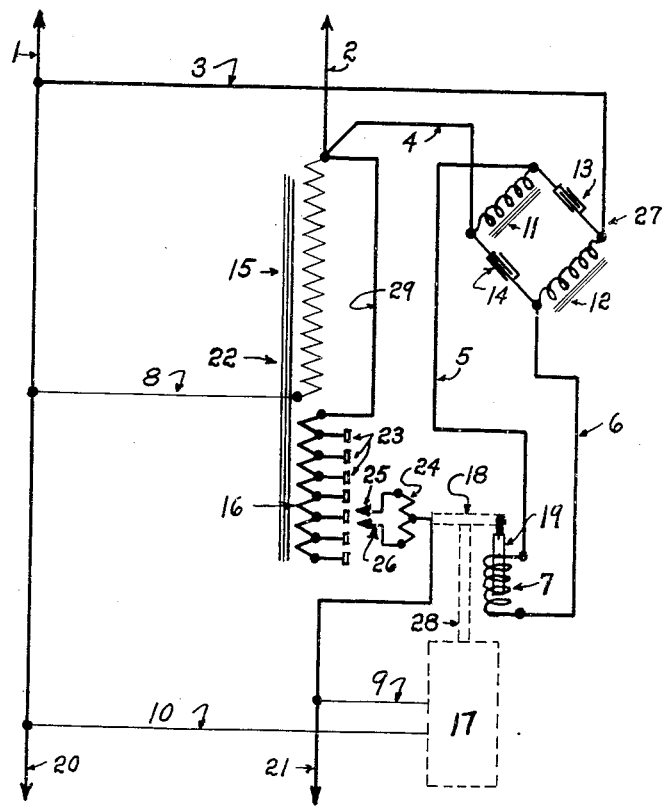

Sept. 19, 1944.  E. H. HAUG  2,358,456

ELECTRIC REGULATING APPARATUS

Filed Dec. 30, 1942  2 Sheets-Sheet 1

INVENTOR.
Eugene H. Haug
BY Parker & Carter
ATTORNEYS

Patented Sept. 19, 1944

2,358,456

UNITED STATES PATENT OFFICE 2,358,456

ELECTRIC REGULATING APPARATUS

Eugene H. Haug, Chicago, Ill., assignor, by direct and mesne assignments, to La Salle National Bank, Chicago, Ill., as trustee Application December 30, 1942, Serial No. 470,591

7 Claims. (Cl. 172—238)

My invention relates to apparatus for stabilizing the operation of electrical circuits, and has for its principal object the provision of an improved regulating apparatus that is operable to maintain stable operation of an electrical circuit under adverse conditions, such as those encountered in the operation of distribution and transmission lines subjected to heavy loads.

The maximum load that can be safely carried by a distribution or transmission line is dependent on the character of the regulating apparatus utilized to maintain a constant circuit voltage. If the regulating apparatus is sluggish in its action, variations in load are likely to produce instability in the operation of synchronous machines connected to the circuit, unless the circuit load is maintained below a predetermined value. This tendency to instability imposes a serious limitation on the magnitude of the load that can be safely carried by an alternator, transmission, and distribution line provided with the usual motor operated step and induction type of regulating apparatus.

In accordance with my invention the tendency to instability is greatly decreased and the load that can be carried by the transmission and distribution line is correspondingly increased by the provision of a stabilizing or regulating apparatus comprising a step or induction regulator in combination with a resonant circuit arrangement, having the property of introducing a leading kilovoltampere into the line, of a value that is proportional to the voltage correction made by the regulator.

Since most lines have power factors below unity, there is usually a considerable amount of lagging wattless current flowing in the transmission and distribution circuits. When a leading kilovoltampere is introduced into the line such as that given by shunt capacitors, the lagging wattless current is removed from the section of the circuit between the capacitor and the source of power. The rating of most distribution equipment is determined by heating. By reducing the total current, the system capacity is substantially increased. The load carrying ability is also fixed by voltage drop. Reduction in the current in the circuit naturally improves the voltage. Since all circuits are inductive, the current drawn by shunt capacitors results in a rising voltage characteristic which further improves the progressive drop in voltage caused by load current. Reduction in voltage drop may therefore be brought about by the use of capacitors.

In order to maintain a substantially constant voltage on the line the capacity required to stabilize the voltage should be proportional to the load and therefore proportional to the voltage correction made by the regulator.

Heretofore several arrangements have been made for introducing a leading kilovoltampere into the line proportional to the tap change, such as placing a capacitor between one end of the transformer winding and the tap contactor, so that a voltage is impressed upon the capacitor proportional to the tap change and hence a leading kilovoltampere drawn proportionally. This arrangement is very impractical, because it not only requires a very large and impractical capacitor but also requires large tap change contacts, since the tap change contact not only must interrupt the load current but also the capacitor current.

The voltage regulating apparatus of my invention obviates all the above mentioned defects, and provides a regulator that is free from hunting, and requiring less frequent tap changing in order to stabilize the voltage.

My invention will be better understood from the following description when considered in connection with the accompanying drawings, and its scope will be pointed out in the appended claims. In the drawings, Figure 1 illustrates an arrangement for introducing a leading current in the supply circuit by controlling the current vector, while Figure 2 illustrates an arrangement for introducing a leading current by controlling the voltage vector.

Figure 2:
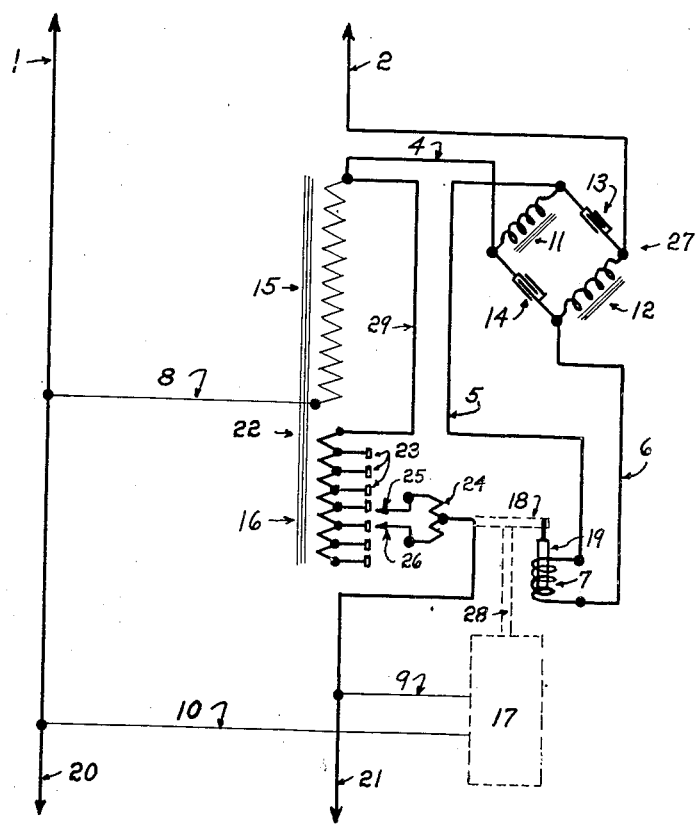

Referring now to Figure 1, lines 1 and 2 indicate the source of supply or the voltage to be regulated. 22 indicates an auto-transformer of which 15 is the primary winding and 16 is the secondary winding. The secondary 16 has several taps 23. These taps make contact with contact cores 25 and 26. A preventative winding 24 is connected to taps 25 and 26. The mid-point of preventative winding 24 is connected to line 21. Lines 20 and 21 connect to the load side of the regulating system. A monocyclic square 27, consisting of capacitors 13 and 14 and reactors 11 and 12, is connected to lines 1 and 2 by means of lines 3 and 4. Monocyclic square 27 has is constant current or load side connected to a variable inductive reactance 7 by means of lines 5 and 6. Variable inductive reactance 7 has a movable iron core 19 connected to a support 18 which also supports contactors 25 and 26. A voltage sensitive device 17 operates arm 28 which is fastened to support 18.

The operation of the device is as follows: should the voltage rise across lines 20 and 21, voltage sensitive device 17 will operate arm 28, together with support 18 and contactors 25 and 26, in a manner to have contactors 25 and 26 to engage contacts 23 of the secondary 16 of the transformer 22 in a manner to lower the voltage in lines 20 and 21 to its proper value. Should the voltage lower across lines 20 and 21 the operation is the same as above described but in the reverse order.

I have found that when using resonant circuits like the monocyclic square, etc., for transforming constant potential into constant current, and introducing into the load or constant current circuit an inductive reactance, the current in the constant potential or supply side of the resonant circuit reverses its power factor angle and becomes leading. The value of the phase angle of lead in current in the constant potential or supply side of the resonant circuit is equal to the value of the phase angle in the lag of current in the constant current or load side of the resonant circuit. Since iron core of variable reactor 7 is connected to support 18 in a manner when contactors 25 and 26 engage contacts 23 of secondary winding 16 to lower the voltage to the load side 20 and 21, the inductive reactance of reactor 7 decreases proportionally. Also if contactors 25 and 26 operate to increase the voltage between lines 20 and 21 the inductive reactance of reactor 7 increases proportionally. Hence a leading current taken by lines 3 and 4 is proportional to the inductive reactance of reactor 7, and hence proportional to the tap change of contacts 23 and contactors 25 and 26, which in turn is proportional to the voltage correction between line 20 and 21, and therefore proportional to the load.

Referring now to Figure 2, it will be noted that Figure 2 is similar to Figure 1, the only difference being that in Figure 1 the input end of the monocyclic square 27 is connected across the source of supply 1 and 2, while Figure 2 has the input end of the monocyclic square connected in series circuit relation to the source of supply line 2. Electrically speaking, in Figure 1, the current vector is made to change, while in Figure 2 the voltage vector is made to change. Both methods produce the same result, of introducing a leading current in the source of supply circuit.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:

1. In combination with an alternating current supply circuit, an automatic regulating device, a resonant circuit device for transforming constant potential to constant current, a variable reactor in the output circuit of said resonant circuit device, and a load circuit, said automatic voltage regulating device and said variable reactor being so arranged that upon a voltage change in said load circuit said automatic voltage regulating device and said variable reactor will operate simultaneously in a manner to correct the voltage and introduce a leading current in said alternating current supply circuit, which is proportional to the amount of voltage correction made.

2. In combination with an alternating current supply circuit, an automatic regulating device, a resonant circuit device for transforming constant potential to constant current, a variable reactor in the output circuit of said resonant circuit device, and a load circuit, said automatic voltage regulating device and said variable reactor being so arranged that upon a voltage change in said load circuit said automatic voltage regulating device and said variable reactor will operate simultaneously in a manner to correct the voltage and introduce a leading current in said alternating current supply circuit.

3. In combination with an alternating current supply circuit, a booster transformer with a tap changing device, a monocyclic square, a variable reactor in the output circuit of said monocyclic square, a voltage sensitive device in the load circuit, said tap changing device and said variable reactor being so arranged with the voltage sensitive device that upon a voltage change in said load circuit said tap changing device will operate simultaneously with said variable reactor to correct said voltage change and simultaneously introduce a leading current into said alternating current supply circuit, which is proportional to the said voltage change.

4. In combination with an alternating current supply circuit, a booster transformer with a tap changing device, a resonant circuit device, a variable reactor in the output circuit of said resonant circuit device, a voltage sensitive device in the load circuit, said tap changing device and said variable reactor being so arranged with the voltage sensitive device that upon a voltage change in said load circuit said tap changing device will operate simultaneously with said variable reactor to correct said voltage change and simultaneously introduce a leading current into said alternating current supply circuit.

5. In combination with an alternating current supply system, an automatic voltage controlling device, a power factor reversing device, a variable reactor in the output circuit of said power factor reversing device, and a load circuit, said automatic voltage controlling device and said variable reactor being so arranged that upon a voltage change in said load circuit a voltage correction is made to maintain a constant voltage in said load circuit, and also introducing a leading current in said alternating current supply circuit, which is proportional to the voltage correction made.

6. In combination with an alternating current supply system, an automatic voltage controlling device, a power factor reversing device, a variable reactor in the output circuit of said power factor reversing device, and a load circuit, said automatic voltage controlling device and said variable reactor being so arranged that upon a voltage change in said load circuit a voltage correction is made to maintain a constant voltage in said load circuit, and also introducing a leading current in said alternating current supply circuit.

7. The combination of a circuit submitted to unstable operating conditions when its load exceeds a predetermined value, means for controlling the instability of said circuit, a power factor angle reversing device comprising a resonant circuit with a variable reactor in its output circuit, and a load circuit, said variable reactor being connected to said control means in a manner to stabilize the operating condition by maintaining a constant voltage in the load circuit and simultaneously introducing a leading current in said circuit submitted to unstable operating conditions, proportional to the amount of control required.

EUGENE H. HAUG.